United States Patent
Widrig et al.

(10) Patent No.: US 10,267,344 B2
(45) Date of Patent: Apr. 23, 2019

(54) COMPRESSION RING

(71) Applicant: Oetiker Schweiz AG, Horgen (CH)

(72) Inventors: Markus Widrig, Benken SG (CH); Manuel Muller, Stetten (CH)

(73) Assignee: OETIKER SCHWEIZ AG, Horgen (CH)

( * ) Notice: Subject to any disclaimer, the term of this patent is extended or adjusted under 35 U.S.C. 154(b) by 17 days.

(21) Appl. No.: 15/500,204

(22) PCT Filed: Feb. 20, 2015

(86) PCT No.: PCT/EP2015/053619
§ 371 (c)(1),
(2) Date: Jan. 30, 2017

(87) PCT Pub. No.: WO2016/045801
PCT Pub. Date: Mar. 31, 2016

(65) Prior Publication Data
US 2017/0276156 A1    Sep. 28, 2017

(30) Foreign Application Priority Data

Sep. 26, 2014 (EP) .................................. 14186647

(51) Int. Cl.
*F16B 2/08* (2006.01)
*F16L 33/02* (2006.01)

(52) U.S. Cl.
CPC ................ *F16B 2/08* (2013.01); *F16L 33/02* (2013.01)

(58) Field of Classification Search
CPC ........ F16B 2/08; F16L 33/02; Y10T 24/1457; Y10T 24/148
See application file for complete search history.

(56) References Cited

U.S. PATENT DOCUMENTS 5,001,816 A * 3/1991 Oetiker .................... F16B 2/08
                                                    24/20 CW
5,150,503 A * 9/1992 Muller ..................... F16B 2/08
                                                    24/20 EE
(Continued)

FOREIGN PATENT DOCUMENTS

EP    0802333 A1    10/1997
ES    2156576 A1    6/2001
(Continued)

OTHER PUBLICATIONS

International Search Report and Written Opinion for Application No. PCT/EP2015/053619 dated Dec. 5, 2015; 3 pgs.

*Primary Examiner* — Robert Sandy
*Assistant Examiner* — Rowland Do
(74) *Attorney, Agent, or Firm* — Cantor Colburn LLP

(57) ABSTRACT

A compression ring made of an initially open clamping band has ends which mutually engage in puzzle-like fashion for closing the compression ring. One band end carries a tongue which projects in the longitudinal direction of the band and has arms extending transversely to the longitudinal direction of the band, and the other end of the band is formed complementarily thereto. The transverse edges of the arms, which extend transversely to the longitudinal direction of the band and face the free end of the tongue, each have a convex part at the outer end and a concave part at the inner end.

11 Claims, 1 Drawing Sheet

(56) References Cited

U.S. PATENT DOCUMENTS

| | | | | |
|---|---|---|---|---|
| 5,185,908 A | * | 2/1993 | Oetiker | B23K 26/22 |
| | | | | 24/20 CW |
| 5,768,752 A | * | 6/1998 | Oetiker | F16L 33/02 |
| | | | | 24/20 R |
| 6,421,886 B1 | * | 7/2002 | Oetiker | F16L 33/02 |
| | | | | 24/20 EE |
| 6,511,380 B1 | * | 1/2003 | Oetiker | F16B 2/08 |
| | | | | 277/636 |

FOREIGN PATENT DOCUMENTS

| | | |
|---|---|---|
| RU | 2243442 C2 | 12/2004 |
| WO | 9939123 A1 | 8/1999 |
| WO | 2004113738 A1 | 12/2004 |

* cited by examiner

COMPRESSION RING

CROSS REFERENCE TO RELATED APPLICATIONS

This present application is a 371 National Stage application of PCT Application No. PCT/EP2015/053619 filed Mar. 31, 2016, the contents of which are incorporated by reference herein.

BACKGROUND

WO 99/39123, WO 2004/113738 A1 and ES 2 156 576 disclose compression rings which consist of an open clamping band the ends of which engage one another in puzzle-like fashion for closing the compression ring. One of the band ends carries a tongue which projects in the longitudinal direction of the band and has arms extending transversely to the longitudinal direction of the band. The other band end is shaped complementarily thereto. In the known compression rings, the transverse edges of the tongue, which extend transversely to the longitudinal direction of the band and face the free end of the tongue, extend at right angles or obliquely to the longitudinal direction of the band.

Compression rings of this type serve to secure tubular components, such as hoses, on the periphery of cylindrical objects, such as pipes, and are particularly suited for use in restricted places where common clamping rings with projecting ear-like tensioning elements cannot be used.

Closed compression rings that are made from sections of tubular material are disadvantageous because the tubular sections require processing and every ring diameter requires properly dimensioned stock material.

In compression rings made of open clamping bands, there is a problem in the stability of the connection between the end edges of the band, specifically with respect to expansive forces which occur in the use of the compression ring and try to open the ring.

SUMMARY

The invention is concerned with the general object of avoiding, at least in part, problems as occur with comparable prior art compression rings. A more specific object of the invention may be seen to reside in providing a compression ring having increased stability in the mutual connection of the band ends.

This object is achieved by the invention defined in claim 1. The compression ring formed in accordance with claim 1 consists of a clamping band the ends of which the engage one another in puzzle-like fashion for closing the compression ring, wherein one of the band ends carries a tongue projecting in the longitudinal direction of the band and having arms extending transversely to the longitudinal direction, and the other band end is shaped complementarily thereto, and wherein, on at least one arm, the transverse edge which extends transversely to the longitudinal direction of the band and faces the free end of the tongue has a convex part at its outer end and a concave part at its inner end.

Measurements have shown that in a compression ring according to the invention, the resistance to expansion forces is up to 25 percent higher than in a conventional compression ring in which large portions of the available width must be spent in favour of a good compressibility.

It appears that the deformations which occur during compression, and possibly during swaging, of the mutually engaging edges of the band ends are reduced by shaping the said transverse edges in accordance with the invention.

As a result, the compression ring of the invention is capable of withstanding higher loads with identical dimensions and can be used with larger diameters.

Preferably, the convex and concave parts have substantially part-circular edges, wherein the height of the convex part and the depth of the concave part as measured from the intermediate part of the transverse edge each amounts to 0.5 to 0.8 percent of overall length of the closure. Excessive deviations will weaken the arm; too small deviations will result in an insufficient anchoring effect.

Advantageously, the transverse edge of the arm facing away from the free end of the tongue forms a recess extending toward the end of the tongue which further increases the anchoring force.

To avoid transverse forces, the tongue is formed symmetrically with respect to the longitudinal band axis and carries on either side three arms with have lengths that decrease toward the free end of the tongue. The space measured in the longitudinal direction of the band between the transverse edges having the convex and concave parts of adjacent arms amounts to substantially ⅙ of the overall length of the closure. This shape will achieve optimal engagement between the band ends within the limits of what can be manufactured.

A further increase in the anchoring force can be obtained swaging by the two band ends with one another.

BRIEF DESCRIPTION OF THE DRAWING

An embodiment of the invention will be explained below with reference to the drawing, in which.

EMBODIMENTS

Figure 1:
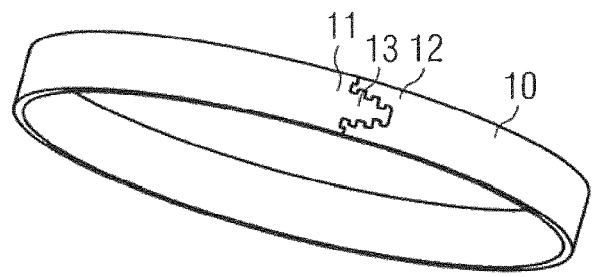
FIG. 1 shows compression ring.

The compression ring shown in FIG. 1 consists of an initially open metallic clamping band 10 the ends 11, 12 of which are so shaped that they engage one another in puzzle-like fashion. To this end, a tongue 13 is formed at the left band end 11 in FIG. 1 and a recess 14, which is shaped complementarily to the outline of the tongue 13, is formed at the right band end 12.

Figure 2:
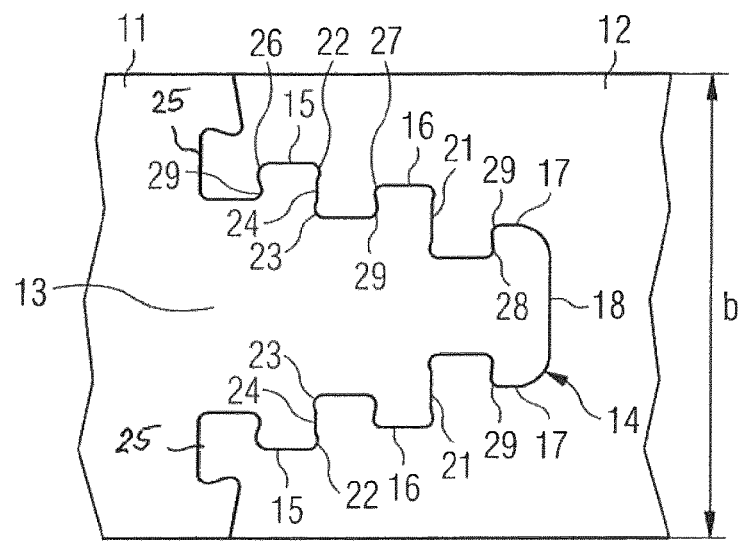
FIG. 2 is an enlarged view of the mutually engaging band ends of the compression ring of FIG. 1.

In accordance with FIG. 2, the tongue 13 is symmetrical with respect to the longitudinal axis of the band 10 and carries on either side three arms 15, 16, 17 which extend transversely to the longitudinal direction of the band and have lengths that decrease toward the free tongue end 18.

Each of the transverse edges 20, 21 of the arms 15, 16 which extend transversely to the longitudinal direction of the band and face the tongue end 18, has a convex part 22 at its free outer end and a concave part 23 at its inner end connected to the body of the tongue 13.

Figure 3:
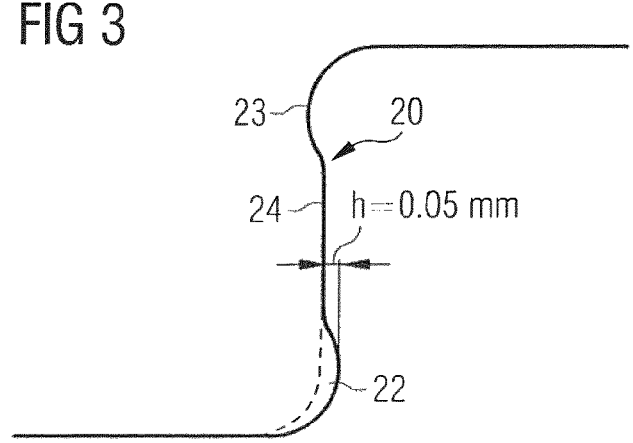
FIG. 3 is an again enlarged representation of a part of the arrangement shown in FIG. 2.

As best seen in FIG. 3, the convex part 22 and the concave part 23 each have part-circular edges and deviate from the straight intermediate part 24 of the transverse edge 20, 21 by an amount h which is typically 0.5 to 0.8 of the overall length of the closure, i.e. of the length of the tongue 13. For a typical width b of the clamping band of 10 mm, the amount h is about 0.05 mm. Different from the embodiment shown, the further transverse edge 25 may be shaped in the same way as in FIG. 3.

The spaces, measured in the longitudinal direction of the band, between the transverse edges 20, 21 and 25 are identical and amount to about ⅙ of the overall length of the closure. The transverse edges 26, 27, 28 of the three arms 15, 16, 17 each have an offset 29 which forms an undercut for achieving an additionally anchoring between the two band ends 11, 12.

In the subsequent compression, the band ends 11, 12 are pressed against one another and swaged. Due to the compression, the diameter of the ring is reduced thereby compressing the object to be fastened. After the compression, the object seeks to expand whereby the compression ring and the connection between its band ends 11, 12 are placed under tensile stress. At this time, the hook formed by the offset 29 provides a safety measure against lateral break away.

REFERENCE NUMBERS

10 Clamping band
11, 12 Band ends
13 Tongue
14 Recess
15 . . . 17 Arms
18 Tongue end
20, 21 Transverse edges
22 Convex part
23 Concave part
24 Intermediate part of 21, 22
25 Transverse edge
26 . . . 28 Transverse edges
29 Offset

The invention claimed is:

1. A compression ring formed of a clamping band, the ends of which engage one another in puzzle-like fashion for closing the compression ring, wherein one band end carries a tongue projecting in the longitudinal direction of the band and having arms extending transversely to the longitudinal direction of the band, and the other band end is formed complementarily thereto, characterized in that, on at least one arm, the transverse edge which extends transversely to the longitudinal direction of the band and faces the free end of the tongue has a straight intermediate part, at its outer end a convex part protruding from the straight intermediate part, and at its inner end a concave part recessed from the straight intermediate part.

2. The compression ring of claim 1, wherein the convex part and the concave part have essentially part-circular edges.

3. The compression ring of claim 1, wherein the height (h) of the convex part and the depth (h) of the concave part as measured from the intermediate part of the transverse edge each amounts to 0.5 to 0.8 percent of overall length of the tongue.

4. The compression ring of claim 1, wherein the transverse edge of the arm, which faces away from the free end of the tongue, forms a recess extending toward the end of the tongue.

5. The compression ring of claim 1, wherein the tongue is symmetrical with respect to the longitudinal band axis.

6. The compression ring of claim 1, wherein the tongue has three arms on either side.

7. The compression ring of claim 1, wherein the arms have lengths which decrease toward the free end of the tongue.

8. The compression ring of claim 1, wherein the space, measured in the longitudinal direction of the band, between the transverse edges having the convex and concave parts of adjacent arms amounts to substantially ⅙ of the overall length of the tongue.

9. The compression ring of claim 1, wherein the two band ends are swaged with one another.

10. A compression ring comprising:
a clamping band, the band having a first end with a tongue projecting in the longitudinal direction of the band and having arms extending transversely to the longitudinal direction of the band, the band having a second end being formed complementary to the first end, wherein the first end and the second end engage in a puzzle-like fashion for closing the compression ring;
wherein on at least one arm, the transverse edge which extends transversely to the longitudinal direction of the band and faces the free end of the tongue has a straight intermediate part, at its outer end a convex part deviating from the straight intermediate part, and at its inner end a concave part deviating from the straight intermediate part.

11. A compression ring comprising:
a clamping band, the band having a first end with a tongue projecting in the longitudinal direction of the band and having arms extending transversely to the longitudinal direction of the band, the band having a second end being formed complementary to the first end, wherein the first end and the second end engage in a puzzle-like fashion for closing the compression ring;
wherein on at least one arm, the transverse edge which extends transversely to the longitudinal direction of the band and faces the free end of the tongue has a straight intermediate part, at its outer end a convex part deviating from the straight intermediate part, and at its inner end a concave part deviating from the straight intermediate part,
wherein the space, measured in the longitudinal direction of the band, between the transverse edges having the convex and concave parts of adjacent arms amounts to substantially ⅙ of the overall length of the tongue.

* * * * *